W. MILLER.
RUBBER MOULDING.
No. 99,932. Patented Feb. 15, 1870.
Fig: 1.
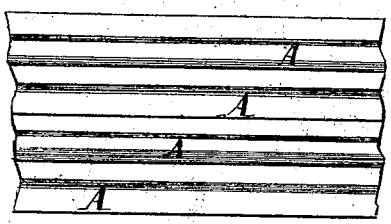
Fig: 2.
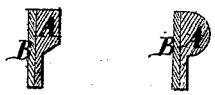
Fig: 3.
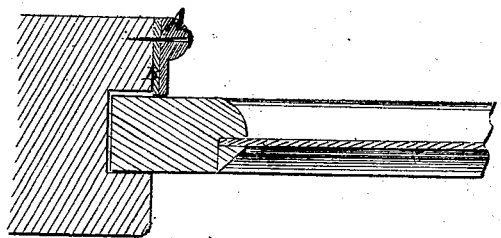
Witnesses: Inventor:

United States Patent Office.

WILLIAM MILLER, OF BOSTON, MASSACHUSETTS.

Letters Patent No. 99,932, dated February 15, 1870.

IMPROVED WEATHER-STRIP.

The Schedule referred to in these Letters Patent and making part of the same.

*To all whom it may concern:*

Be it known that I, WILLIAM MILLER, of Boston, Suffolk county, in the State of Massachusetts, have invented a new and improved Rubber Molding; and I do hereby declare that the following is a full, clear, and exact description thereof, which will enable others skilled in the art to make and use the same, reference being had to the accompanying drawings forming part of this specification, in which—

Figure 1 represents a portion of a sheet of my improved molding before it is cut apart.

Figure 2 are cross-sections of pieces of my improved molding, showing different forms.

Figure 3 is a cross-section of a piece of the same, illustrating its use.

My invention has for its object to furnish an improved rubber molding, which shall be so formed as to adapt it for use around windows, doors, &c., as weather-strips, to prevent the wet and cold from finding their way in around said doors and windows; and It consists in the molding constructed as hereinafter more fully described.

The molding is made in sheets of any desired number of strips in a sheet, and of any desired length, according to the size of the molds in which it is made.

The molds for making the molding are made of iron or other suitable material, and the grooves in which the projecting parts A of the moldings are formed are made parallel with each other, and of such a form as it is desired that the said projecting part of the molding should have.

The grooves of the molds, which should be about three-sixteenths of an inch apart, are filled with a composition of rubber.

A strip of rubber packing, B, is then spread over the molds, and a plate of iron is then placed upon the top of the packing and pressed down upon the mold. The molds are then subjected to a greater or lesser heat, according as the hard part of the molding is required to be more or less hard. The projecting part A of the molding will thus be hard and capable of receiving a polish, while the sheet of packing B, which forms the flange, will remain soft and will be permanently united to the hard part. The strips are then cut apart by cutting along one side of the projecting or hard part A of the molding, as shown in figs. 2 and 3.

Molding thus constructed can be much more conveniently applied to curved windows and doors than the ordinary wood and rubber moldings.

Having thus described my invention,

I claim as new, and desire to secure by Letters Patent—

An improved rubber molding, formed by uniting soft-rubber packing, to form the flange, with a hard-rubber projecting part, substantially as herein shown and described, and for the purpose set forth.

The above specification of my invention signed by me this 6th day of January, 1870.

WILLIAM MILLER.

Witnesses:
A. W. ADAMS,
S. B. HASTINGS.